Patented Aug. 20, 1946

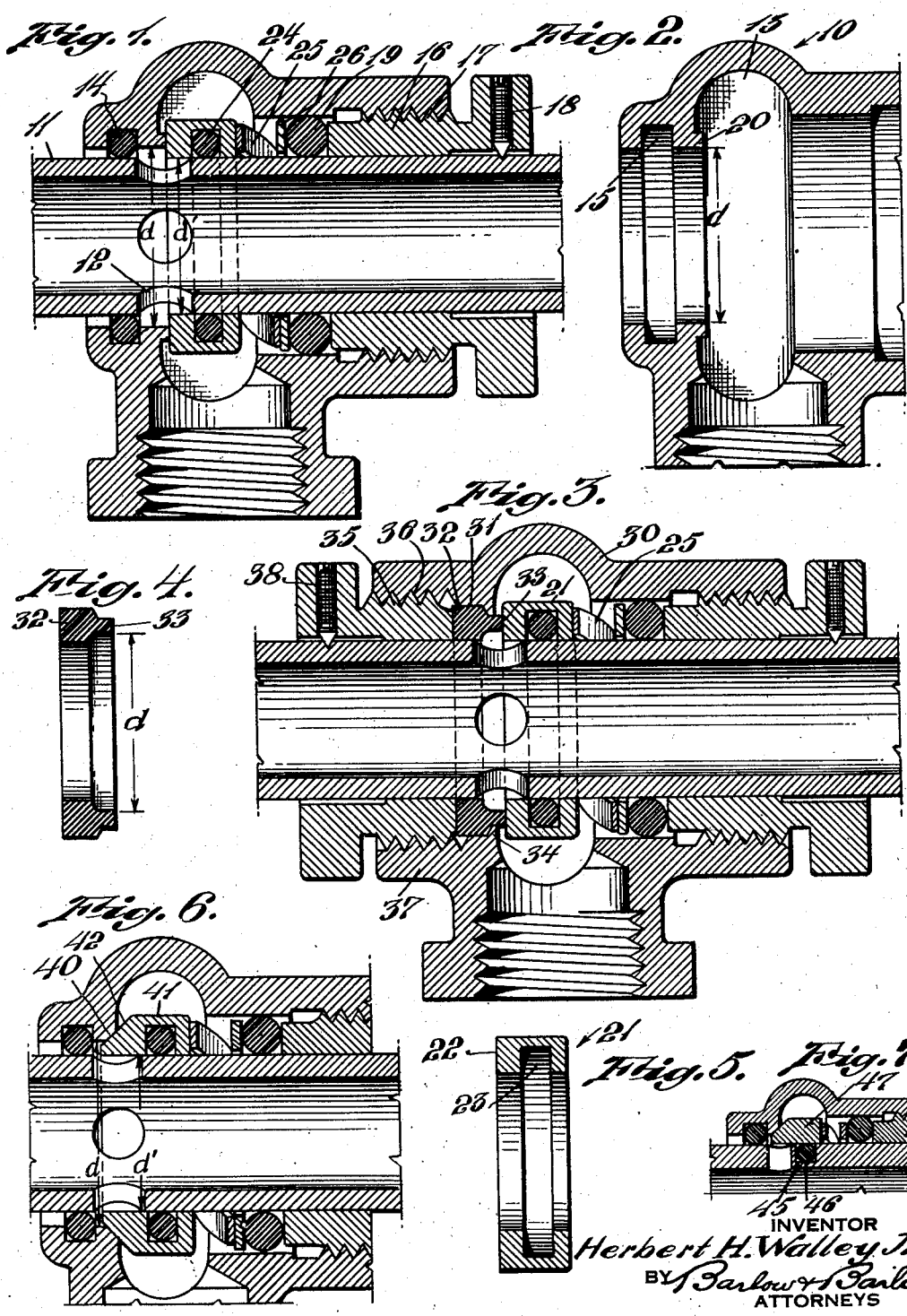

2,406,178

UNITED STATES PATENT OFFICE 2,406,178

RELIEF VALVE

Herbert H. Walley, Jr., Providence, R. I.

Application September 2, 1943, Serial No. 501,018

2 Claims. (Cl. 137—53)

This application relates to a fluid pressure valve of the type which may be used in connection with a through conduit whereby the pressure therein may be controlled.

One of the objects of this invention is to provide a fluid pressure valve which will require but a light spring for the closure of the valve although substantial pressures may be controlled.

Another object of this invention is to provide a fluid pressure valve in which the spring pressure for closing the valve will be sufficiently light so that the valve seat may be made of non-metallic plastic material which may be of a resilient nature.

Another object of the invention is to provide a valve of such construction that the spring pressure which is applied to the valve may be varied by adjustment.

Another object of this invention is to provide a valve of such construction that the fluid pressure which presses upon the valve may be nicely controlled by selection of the parts which control the pressure on the valve, the control being by relative sizing of the parts.

Another object of the invention is to provide a valve which may be applied over an existing conduit by merely tapping the same and sliding the valve into position.

With these and other objects in view, the invention consists of certain novel features of construction, as will be more fully described and particularly pointed out in the appended claims.

In the accompanying drawing:

Fig. 1 is a central sectional view through the valve;

Fig. 2 is a sectional view of one of the body parts which carries the valve seat;

Fig. 3 is a central sectional view of a modified form of valve;

Fig. 4 is a sectional view of the valve seat provided in the valve of Fig. 3;

Fig. 5 is a sectional view of the valve which is common to the form shown in Figs. 1 and 3;

Fig. 6 is a sectional view of a still different modified form of valve constructed on the principles of the other showings.

Fig. 7 is a sectional view of a different modified form of the invention.

In proceeding with this invention I expose an annular valve to fluid pressure but restrict the surface to which the pressure is applied so that a light-weight spring will close the valve even though the pressure of the fluid is substantial. The control of this area to which the pressure is applied is accomplished by the varying of the diameters of the annular seat and the diameter of the valve which projects beyond this seat. The change of either of these diameters is contemplated but in the construction illustrated it is simpler to change the diameter in the body or stationary part, thus leaving the guiding surface of the moving valve part unchanged. The valve is applied to a conduit by providing openings in the conduit and sliding the valve into position over the opening.

With reference to the drawing the body part shown in Fig. 2 is designated generally 10 which may be telescoped over a tubular conduit 11 for extending through the body part 10 and which will cover openings 12 formed in the conduit 11 through which fluid may escape into the annular chamber 13 provided by the bulging of the part 10. A soft packing seal 14 is located in the recess 15 in the part 10 to engage the conduit 11 at one side of the openings 12 so as to provide a seal between these parts. Another part of the body is designated 16 and has threaded engagement as at 17 with the part 10. This part 16 is held in adjusted position by the set screw 18 engaging the conduit 11 which in effect becomes a part of the body and provides an abutment for the soft packing seal 19 which seals the parts 10 and 11 on the other side of the openings 12 to confine fluid in and adjacent the chamber 13.

The valve seat is designated 20 and consists of a flat annular surface (see Fig. 2) projecting into the chamber 13. The inner diameter $d$ of this surface may be varied for purposes which will hereinafter appear and is of a size greater than the tube 11.

A movable valve designated 21 (shown alone in Fig. 5) is provided with a head portion having a seating surface 22 for engagement with the seating surface 20 of the valve seat. The valve is provided with a recess 23 for the reception of a soft packing 24 which engages the tubular part 11 and provides a seal therewith. The inner diameter of this valve is of a size to be slidably guided on the part 11 having a diameter $d'$ and this diameter becomes the effective diameter for pressure purposes of the valve, and directs the valve in its axial movement toward and from its seat. A spring 25 engages the valve and an abutment washer 26 which in turn engages the packing 19 to urge the valve toward seating position and at the same time applies pressure on the packing 19 to expand it to form a seal. The abutment 16 for the packing 19 may be adjusted to in turn more tightly compress the spring or to relieve some of the pressure thereon as may be desired.

The diameters $d$ and $d'$ are diameters of cylindrical surfaces having the same axis as the axis of the valve. The diameter $d'$ is less than the diameter $d$ so that the sealing surface 22 of the valve 21 extends radially beyond the sealing surface 20 (that shown being inward) of the valve seat, thus exposing the valve to pressure in an area which will be represented by the differential of the diameters $d$ and $d'$. It will be apparent that this area may be changed by changing the diameter $d$ of the seat to expose more or less of the valve. In the construction shown in Fig. 1, the diameter $d'$ will be maintained the same as conduit 11 which presents a guiding surface for movement of the valve along the said conduit 11. If the diameter $d$ is made greater, a greater surface area or differential between $d$ and $d'$ will occur while if the diameter $d$ is made smaller a smaller differential $d$ minus $d'$ will be present. When certain factors are known such as substantially the maximum pressure which is desired in the conduit or tube part 11 of the body and the value of the spring pressure which may be used, and which may be a small amount with reference to the pressure of the conduit tube, the diameter may be calculated so that the proper differential $(d-d')$ will be present on the valve surface 22 so that the valve may be opened by the fluid pressure in the conduit at the proper point. The diameter $d$ may be arranged so that with a fluid pressure in the conduit of 3,000 lbs. a spring pressure of ten to thirty pounds may be utilized and the area so selected as to overcome this spring by a control of the diameter $d$. The part 10 in Fig. 2 may be bored to present the diameter $d$ desired.

In Fig. 3 I have illustrated a valve similar in many respects to the valve shown in Figs. 1 and 2 except that the body part here designated 30 (comparable to the part 10 of Figs. 1 and 2) is provided with a recess 31 for the reception of a ring 32 which presents a sealing surface 33, in place of that sealing surface 20 which is integrally formed with the part 10 as heretofore provided. This sealing ring 32 will be held in position against the flange 34 by the body part 35 threaded as at 36 into engagement with the portion 37 of the body 30 and held in desired position of rotary adjustment by the set screw 38. In the showing in Figs. 3 and 4 this annular ring 32 will be of a resilient soft material so that pressure by the rotary part 35 will also cause it to laterally expand and provide a seal with the tube 11 of the body. By this arrangement the diameter $d$ (see Fig. 4) or inner portion of the sealing surface will control the area which is exposed to the fluid on the valve 21. This construction affords a simple means of adjusting the area exposed to the fluid by interchanging one ring 32 for another which may be of a different diameter $d$. The other parts of this valve shown in Fig. 3 are the same and function the same as those shown in Figs. 1 and 2 and therefore carry the same reference characters.

In Fig. 6 I have illustrated a different modification similar to Fig. 1 but in which the valve seat instead of extending at right angles to the axis of the valve is tapered as at 40 while the valve designated 41 is provided with a tapered surface 42 to engage this seat 40, both seat and valve surface 42 being at the same angle with reference to the axis of the valve. The diameters $d$ and $d'$ of the valve seat and the conduit still however control the area of the valve which will be exposed to the fluid pressure and consequently will reflect the total pressure applied to the valve by the fluid which pressure must be balanced by the spring to control the opening of the valve when a predetermined pressure in the conduit or body part 11 exists.

In Fig. 7 I have shown a modification different from Fig. 6 in that the recess 45 for the packing 46 is in the body part 11 instead of in the movable valve and the valve 47 is a solid annular structure. In this case $d'$ will define the line of contact of the packing 46 with the inner diameter of the valve.

By this arrangement a very small area upon which the fluid presses may be provided so that a very light spring may be used and thus a non-metallic surface which would ordinarily be distorted under great pressure may be utilized for a valve of this character. Also, where the valve seats with a light pressure, a seal against leakage of fluid may be maintained without injury to the sealing surfaces which might occur under high spring pressure.

I claim:

1. In a valve device automatically operated by a predetermined rise in fluid pressure, a conduit comprising an open ended tubular member provided with a plurality of circumferentially aligned openings therein, a valve body surrounding said conduit and provided with an annular seat surrounding and spaced from said conduit and adjacent said openings, packings engaging the body and conduit on either side of the said openings and seat to seal fluid from escape from the body, said body having a port leading therefrom, an annular valve slidably engaging said conduit and having a surface engaging said annular seat, a packing round in cross section engaging said valve and said conduit sealing the escape of fluid between said valve and said conduit, the adjacent surfaces of said annular seat and said conduit being so selected as to present a predetermined area of the valve to the pressure fluid and a spring urging said valve to engage said seat against said pressure fluid with a predetermined force.

2. In a valve device automatically operated by a predetermined rise in fluid pressure, a conduit comprising an open ended tubular member provided with a plurality of circumferentially aligned openings therein, a valve body surrounding said conduit and provided with a removable annular seat surrounding said conduit and adjacent said openings and sealing with said conduit on one side of said openings, a packing engaging the body and conduit on the other side of the said openings to seal fluid from escape from the body, said body having a port leading therefrom, an annular valve slidably engaging said conduit and having a surface engaging said annular seat, a round packing between said valve and conduit, the adjacent surfaces of said annular seat and said conduit being so selected as to present a predetermined area of the valve to the pressure fluid and a spring urging said valve to engage said seat against said pressure fluid with a predetermined force.

HERBERT H. WALLEY, JR.